Jan. 20, 1953         J. F. CAMPBELL         2,626,011
RECIRCULATING DUSTING SYSTEM
Filed Jan. 24, 1951
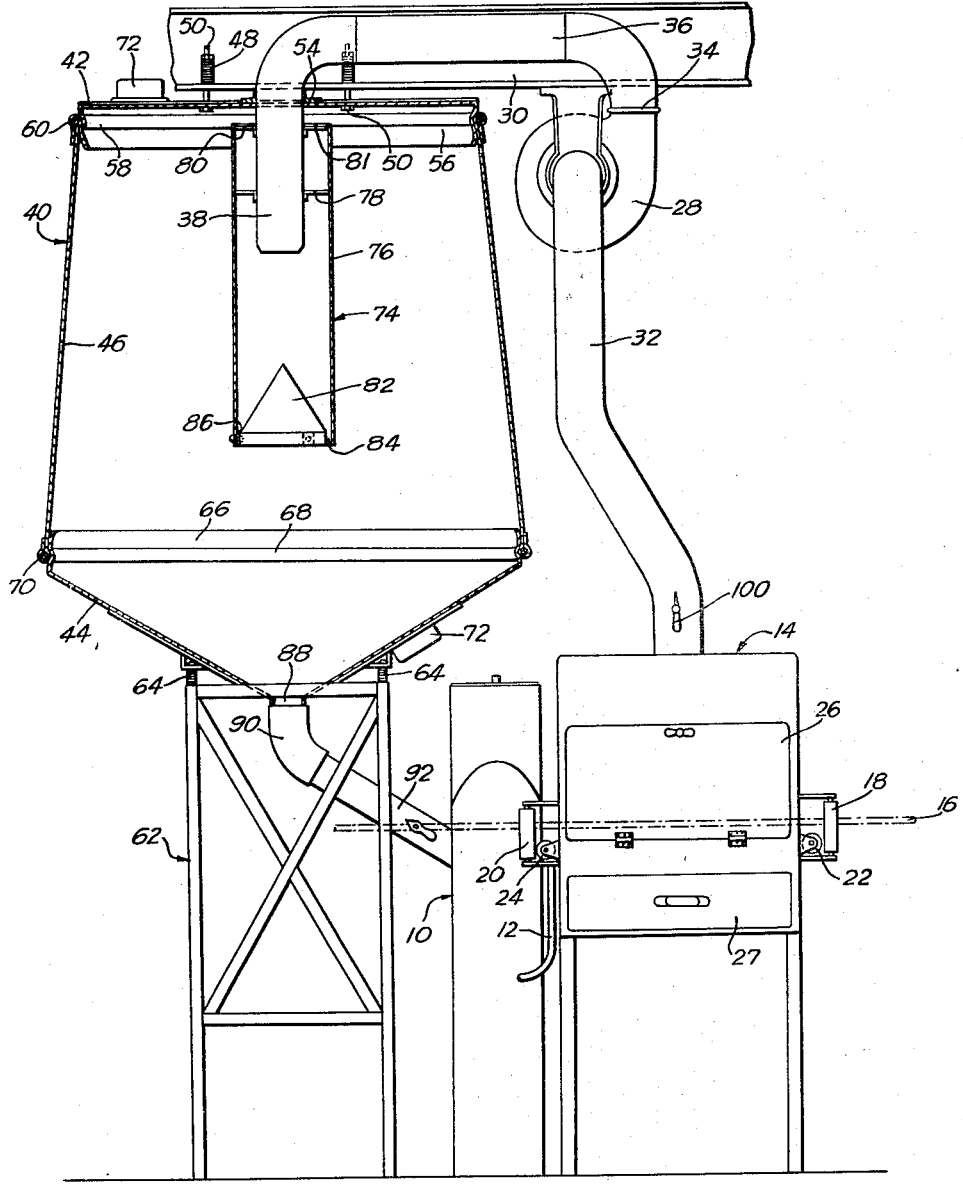
INVENTOR.
John F. Campbell
BY
Oldham & Oldham
ATTORNEYS Patented Jan. 20, 1953

2,626,011

UNITED STATES PATENT OFFICE 2,626,011

RECIRCULATING DUSTING SYSTEM

John F. Campbell, Cuyahoga Falls, Ohio

Application January 24, 1951, Serial No. 207,565

14 Claims. (Cl. 183—58)

My invention relates to a recirculating dusting system for dusting rubber products or the like with soapstone or mica dust, and, more particularly, is concerned with a dust collector and precipitator for removing and reclaiming the dust from dust-laden air.

It is common practice, particularly in the rubber industry, to dust rubber or like materials with a fine soapstone or other types of dust before curing to prevent sticking of the uncured rubber surface or surfaces to each other or to anything with which it or they might come in contact during handling or vulcanizing. This dusting procedure is usually carried out in a well ventilated area and the operator is often required to wear a gas mask or similar filter to prevent breathing in of certain types of dust. Even with these precautions, breathing of the dust has always been considered an occupational hazard for rubber workers. The danger has been even more pronounced with the introduction of fine mica dust often used to give a more glittering finish to the finished rubber product. Mica, being considerably more abrasive than the soapstone, presents a much greater hazard to the operator working with such materials. For this reason, the dusting operation is done under hoods which are connected to large exhaust fans, whereby the dust-laden air, to a large extent, is drawn off and kept out of the surrounding air in the room.

In places where the dusting plant is located in a rural area, no attempt is made to recover the dust from the air but it is simply blown out into the open to be disseminated by the wind. However, in industrial areas, it is essential that the dust be captured and reclaimed. To date, this reclamation has been carried on primarily for purposes of safety and cleanliness, the cost of so recovering the dust being relatively expensive. The present known methods which have been developed collect the dust in individual sacks by means of which the reclaimed soapstone dust can be returned by hand to the dust-dispensing apparatus or otherwise stored.

It is the general object of my invention to avoid and overcome the foregoing and other difficulties of the prior art practices by the provision of a continuously recirculating dusting system which is simple in its operation, inexpensive to install and maintain, and which is efficient, and completely safe.

Another object of my invention is to provide a dusting system which recirculates the dust automatically so that it can be used over and over again without separate bagging and handling operations.

Another object of my invention is to provide a dust separating and reclaiming apparatus which is self-cleaning.

This and other objects of my invention which will become apparent as the description proceeds are achieved by the provision of a recirculating dusting system for dusting rubber products or the like including a dust dispenser, an enclosed dusting chamber wherein the rubber products are dusted, the dust dispenser discharging into the dust chamber, an exhaust fan operatively associated with the dust chamber, a dust reclaimer, an expansion chamber inside the dust reclaimer, a flexible intake hose connecting the outlet of the exhaust fan with the expansion chamber, and a flexible outlet hose connecting the bottom of the dust reclaimer to the intake of the dust dispenser for returning the dust to the dispenser.

The dust reclaimer includes a fine mesh filter member having substantially the shape of an open-ended truncated cone, a flat circular cover forming the top thereof and in sealed relation to the top perimeter of the filter member, an inverted cone-shaped bottom in sealed relation to the bottom perimeter of the filter member, a flexible suspension supporting the reclaimer from the cover, a vibrator mounted on the cover, and a vibrator mounted on the bottom. The intake hose passes through the cover into an expansion chamber associated with the discharge end of the intake hose and located within the confines of the dust reclaimer. An outlet hose in association with the inverted cone-shaped bottom of the reclaimer adjacent the apex thereof directs the precipitated dust back into the dust dispenser.

For a better understanding of the invention, reference should be had to the accompanying drawing, wherein:

The drawing is an elevational view, partly in vertical section, illustrating the essential features of my invention.

With specific reference to the form of the invention illustrated in the drawing, the numeral 10 indicates generally a dust-dispensing unit for generating a dust-laden atmosphere. Such dust-dispensing unit can be of any known type, but preferably is one which is capable of delivering soapstone dust or the like thoroughly mixed and carried by a stream of air at an adjustable discharge rate, for example, of approximately 3.5 cubic feet per minute. A typical satisfactory dust dispenser is illustrated in U. S. Patent No. 2,120,003.

The air and dust mixture is discharged from the dispensing unit 10 through a flexible hose 12 which couples the dispensing unit 10 to a fully enclosed dusting chamber indicated generally at 14. The dusting chamber 14, likewise, can take any one of a number of forms, depending on the shape, size, and type of material being dusted. The particular form of dusting chamber 14 illustrated in the drawings is used for dusting garden hose 16 or the like, shown in chain dash lines. Such hose, prior to being cured, passes continuously through the dusting chamber 14, where it is thoroughly coated with a layer of soapstone dust. The hose 16 passes through openings in the sides of the chamber and is guided in its movement therethrough by means of vertical rollers 18 and 20 and horizontal rollers 22 and 24, all of which are rotatably secured to the chamber frame as shown. Flexible sleeves or curtains may be associated with the openings in the sides of the chamber and extend around the hose 16 to further enclose the chamber. The dusting chamber 14 is also preferably provided with a door 26 which gives access to the interior of the chamber. A sealed but removable drawer 27 is provided at the bottom of the dusting chamber, which acts as a trap to collect bits of metal or other foreign material. Appropriate baffles for producing uniform dusting of the product over all surfaces are provided in the dusting chamber. The shape and form of these baffles is preferably designed for each particular dusting job but forms no essential part of the present invention.

The recirculating system employs an exhaust fan 28. The fan 28 is preferably supported from an overhead beam 30, which may be part of the building structure. The intake to the exhaust fan 28 is connected through a large metal conduit 32 to the top of the enclosed dusting chamber 14. Thus, the exhaust fan 28 maintains the interior of the dusting chamber at a reduced pressure (less than atmospheric), which means that any openings in the enclosed chamber will give rise to an influx of air, thereby preventing the very fine soapstone dust from being carried into the surrounding room. Because of this reduced pressure in the interior of the dusting chamber, no particular seal or close-fitting cover is generally required at the openings in the chamber through which the hose passes.

The outlet 34 of the exhaust fan 28 is connected through a flexible tubing or duct 36 to a discharge section 38. The discharge section 38 extends down into the dust reclaim unit indicated generally at 40.

The dust reclaim unit includes a dust separator and is made up in three sections, namely, a top cover 42, an inverted conical bottom 44, and a truncated-conical, bag-like air filter member 46 forming the enclosing side wall. The filter is made of sufficiently fine mesh to filter out the soapstone dust particles from the air, and is preferably made of special filter cloth or chamois. The top or cover 42 is resiliently suspended from the overhead beam 30, preferably by means of coil springs 48 in compression and bolts 50 passing therethrough. The discharge section 38 of the duct 36 passes through a hole in the cover 42 and is rigidly secured thereto by means of a collar 54. The cover 42 is provided with a downwardly directed peripheral flange 56 which has a shallow groove 58 formed therein. This groove is adapted to receive and secure the upper edge of the filter member 46, the filter member being preferably held in place by means of a spring, elastic band, or draw cord 60 around its upper periphery.

The inverted conical bottom 44 forming the bottom of the dust reclaimer 40 is supported on a light framework, indicated generally at 62, by means of flexible mounting springs 64. The conical bottom 44 has an upwardly directed flange portion 66 around its outer periphery, said flange 66 having a shallow groove 68 formed therein for receiving the lower peripheral edge of the filter member 46. The lower periphery has a flexible band, spring, or draw cord 70, which is received in and engages the groove 68 to secure the lower edge of the filter member 46.

An important feature of the invention is that the outer circumference of the bottom 44 of the dust reclaim unit is larger than that of the top cover 42 to give the filter member 46 an upwardly and inwardly sloping surface. This is done purposely so that dust collecting on the inner surface of the filter member 46, when shaken loose therefrom, drops directly down into the cone-shaped bottom, thereby keeping the bag-like filter member relatively free of accumulated or pile-like layers of dust.

To facilitate loosening and shaking down the dust as it collects on the inner surface of the filter member, electric vibrator units 72 are secured to both the top 42 and the bottom 44 of the reclaimer. These vibrator units, by virtue of the flexible suspension and mounting, continuously shake the top and bottom portions of the dust reclaimer when the system is in operation so that dust accumulating on the inside of the filter bag is shaken loose and allowed to drop down into the funnel or cone-shaped bottom 44. This action keeps the filter member 46 comparatively clean and free of accumulated layers of dust.

Associated with the discharge section 38 is an expansion chamber, indicated generally at 74. The expansion chamber 74 includes a cylindrical sleeve 76 open at both ends. The cylindrical sleeve is supported from the discharge section 38 of the duct 36 by means of brackets 78 and 80. Mounted in the lower end of the cylindrical portion 76 is a conical baffle 82. The outer diameter of the conical baffle is slightly smaller than the inner diameter of the cylindrical sleeve 76 so that a circular ring-shaped opening is provided between the lower edge of the cone and the inner wall of the cylindrical sleeve 76, as indicated at 84. The conical baffle 82 is held in position by means of three spaced brackets 86.

The purpose of the expansion chamber 74 is to materially reduce the velocity of the air laden with dust particles as it leaves the discharge section 38 and enters the dust reclaim unit and at the same time separate out the major portion of the dust from the air. Dust-laden air discharged at 38 is directed against the cone 82. The majority of the air is redirected back up over the open top 81 of the expansion chamber 74, but much of the dust, being heavier, drops down through the small ring-shaped opening 84 surrounding the base of the cone 82, from whence it drops on down into the conical bottom 44 of the reclaim unit 40. Because the air inside the reclaim unit is under pressure produced by the exhaust fan 28, the air is forced through the fine mesh of the filter member 46, which removes any dust still remaining in the air and returns it to the bottom of the reclaim unit by the shaking action of the vibrators 72.

An outlet 88 is provided at the apex of the inverted conical bottom 44. Connected to the outlet 88 is a flexible tube coupling 90 which in turn connects through a dust return duct 92 to the dust dispenser 10 whereby dust collecting in the bottom of the reclaim unit 40 is returned by gravity flow and under light fluid pressure to the dust dispenser.

From the above description, it will be seen that the objects of my invention have been achieved by providing a completely enclosed dusting system which filters and reclaims the dust particles not adhering to the rubber or like material dusted. The dust is kept out of the air in the room surrounding the dusting apparatus, reducing the hazard of breathing the dust into the lungs by the workers. No handling of the dust is required other than the occasional replenishment of the supply in the system. The dust reclaimer is self-cleaning and requires virtually no attention after installation.

While in accordance with the patent statutes, one best known embodiment of my invention has been described and illustrated, it is to be particularly understood that I am not to be limited thereto or thereby, but that the scope of my invention is defined in the appended claims.

I claim:

1. A recirculating dust system for dusting rubber products or the like including a dust dispenser, a partially confined dusting chamber, said dust dispenser being adapted to discharge dust-laden air into said chamber for dusting said rubber products placed within said chamber, an exhaust fan operatively associated with said chamber for removing air and excess dust not adhering to said rubber products, a cylindrical expansion chamber, a conical bottom of smaller diameter and concentrically mounted at one end of said cylindrical expansion chamber, an air duct opening into the other end of said expansion chamber, said duct communicating with the discharge end of said exhaust fan, an air and dust separator surrounding said expansion chamber, said separator including a top cover through which said dust passes in sealed relation thereto, a funnel-like bottom beneath said expansion chamber, enclosing sides in sealed relation to said cover and bottom, said sides being of filter material adapted to pass air under pressure and trap the dust particles, vibrators associated with said cover and bottom whereby dust filtered out by the side walls is shaken to the bottom of the separator, and a dust return pipe between the funnel-shaped bottom of the separator and the dust dispenser.

2. A recirculating dust system for dusting rubber products or the like including a dust dispenser, a partially confined dusting chamber, said dust dispenser being adapted to discharge dust-laden air into said chamber for dusting said rubber products placed within said chamber, an exhaust fan operatively associated with said chamber for removing air and excess dust not adhering to said rubber products, an expansion chamber, an air duct opening into said expansion chamber, said duct communicating with the discharge end of said exhaust fan, an air and dust separator surrounding said expansion chamber, said separator including a top cover through which said dust passes in sealed relation thereto, a funnel-like bottom beneath said expansion chamber, enclosing sides in sealed relation to said cover and bottom, said sides being of filter material adapted to pass air under pressure and trap the dust particles, vibrators associated with said cover and bottom whereby dust filtered out by the side walls is shaken to the bottom of the separator, and a dust return pipe between the funnel-shaped bottom of the separator and the dust dispenser.

3. A recirculating dust system for dusting rubber products or the like including a dust dispenser, a partially confined dusting chamber, said dust dispenser being adapted to discharge dust-laden air into said chamber for dusting said rubber products placed within said chamber, an exhaust fan operatively associated with said chamber for removing air and excess dust not adhering to said rubber products, a cylindrical expansion chamber, a conical bottom of smaller diameter and concentrically mounted at one end of said cylindrical expansion chamber, an air duct opening into the other end of said expansion chamber, said duct communicating with the discharge end of said exhaust fan, filter means surrounding and enclosing said expansion chamber for separating the dust from the air, a vibrator secured to said filter means to shake the dust free from said filter, and a dust return duct associated with the bottom of said filter means whereby the excess dust is returned to said dust dispenser.

4. A recirculating dust system for dusting rubber products or the like including a dust dispenser, a partially confined dusting chamber, said dust dispenser being adapted to discharge dust-laden air into said chamber for dusting said rubber products placed within said chamber, an exhaust fan operatively associated with said chamber for removing air and excess dust not adhering to said rubber products, an expansion chamber, an air duct opening into said expansion chamber, said duct communicating with the discharge end of said exhaust fan, filter means surrounding and enclosing said expansion chamber for separating the dust from the air, a vibrator secured to said filter means to shake the dust free from said filter, and a dust return duct associated with the bottom of said filter means whereby the excess dust is returned to said dust dispenser.

5. A recirculating dust system for dusting rubber products or the like including means for generating a dust-laden atmosphere, means for confining and directing said atmosphere into contact with said rubber products, means for exhausting said dust-laden atmosphere, an open-ended cylindrical sleeve, a conical baffle at one end of said sleeve, said exhaust means discharging said dust-laden atmosphere into the other end of said sleeve, a dust separator surrounding and enclosing said sleeve and baffle, said separator being in sealed relation with said exhaust means, said dust separator having a funnel-shaped bottom and having confining walls of filter material adapted to pass air therethrough but trap the dust, a plurality of vibrators mounted on said separator for shaking dust trapped by the filter material to the bottom thereof, and a dust return duct associated with the bottom and communicating with said generating means whereby the dust separated out of the exhausted atmosphere is returned to the generating means.

6. A recirculating dust system for dusting rubber products or the like including means for generating a dust-laden atmosphere, means for confining and directing said atmosphere into contact with said rubber products, means for exhausting said dust-laden atmosphere, baffle means for reducing the velocity of the dust-laden atmosphere as it is discharged from the exhaust means, a dust separator surrounding and enclosing said baffle means, said separator being in sealed relation with said exhaust means, said dust separator having a funnel-shaped bottom and having confining walls of filter material adapted to pass air therethrough but trap the dust, a plurality of vibrators mounted on said separator for shaking dust trapped by the filter material to the bottom thereof, and a dust return duct associated with the bottom and communicating with said generating means whereby the dust separated out of the exhausted atmosphere is returned to the generating means.

7. A recirculating dust system for dusting rubber products or the like including means for generating a dust-laden atmosphere, means for confining and directing said atmosphere into contact with said rubber products, means for exhausting said dust-laden atmosphere, an open-ended cylindrical sleeve, a conical baffle at one end of said sleeve, said exhaust means discharging said dust-laden atmosphere into the other end of said sleeves, filter means enclosing said baffle means and in sealed relation with said exhaust means whereby the dust is retained within said filter means, a plurality of vibrators operatively associated with the filter means for shaking dust trapped by the filter material to the bottom thereof, and a dust return duct associated with the bottom of said filter means and communicating with said generating means whereby the dust separated out of the exhausted atmosphere is returned to the generating means.

8. A recirculating dust system for dusting rubber products or the like including means for generating a dust-laden atmosphere, means for confining and directing said atmosphere into contact with said rubber products, means for exhausting said dust-laden atmosphere, means for reducing the velocity of the dust-laden atmosphere as it is discharged from the exhaust means, filter means enclosing said last-named means and in sealed relation with said exhaust means whereby the dust is retained within said filter means, vibrating means operatively associated with the filter means for shaking dust trapped by the filter material to the bottom thereof, and a dust return duct associated with the bottom of said filter means and communicating with said generating means whereby the dust separated out of the exhausted atmosphere is returned to the generating means.

9. A recirculating dust system for dusting rubber products or the like including means for generating a soap-store dust-laden atmosphere, means for confining and directing said atmosphere into contact with said rubber products, means for exhausting said dust-laden atmosphere from the association with the rubber articles, filter means for filtering the excess dust from said dust-laden atmosphere, and means for returning said excess dust to said generating means.

10. A dust reclaimer comprising a fine mesh cloth filter member having substantially the shape of an open-ended truncated cone, a flat circular metal top member in sealed relation to the upper opening of said filter member, the top having an opening therethrough, an inverted cone-shaped bottom member in sealed relation to the lower opening in said filter member, said bottom having an opening at the lowermost point thereof, a flexible suspension supporting said top, flexible supporting members for said bottom, an air intake duct passing through the opening in said top and in sealed relation thereto, a dust outlet duct in association with said opening in the bottom of the reclaimer and in sealed relation thereto, a cylindrical sleeve adjacent the discharge end of the intake duct and secured thereto, said sleeve being within the filter member, a cone-shaped baffle of smaller diameter and concentrically mounted adjacent the end of the sleeve remote from the intake duct, a vibrator mounted on the top, and a vibrator mounted on the bottom whereby the filter member is continuously shaken to free the dust clinging to the inner surface of the filter and the dust caused to drop to the bottom of the reclaimer.

11. A dust reclaimer comprising a filter member having substantially the shape of an open-ended truncated cone, a top member in sealed relation to the upper opening of said filter member, the top having an opening therethrough, an inverted cone-shaped bottom member in sealed relation to the lower opening in said filter member, said bottom having an opening at the lowermost point thereof, a flexible suspension supporting said top, flexible supporting members for said bottom, an air intake duct passing through the opening in said top and in sealed relation thereto, a dust outlet duct in association with said opening in the bottom of the reclaimer and in sealed relation thereto, baffle means on the discharge end of said intake duct for reducing the velocity of incoming air, a vibrator mounted on the top, and a vibrator mounted on the bottom whereby the filter member is continuously shaken to free the dust clinging to the inner surface of the filter and the dust caused to drop to the bottom of the reclaimer.

12. In a dust reclaiming unit, a bag-like filter, separate closure means associated with the top and bottom of the filter, an intake duct connected to the top closure means and extending into the filter, an expansion chamber of substantially tube-like shape inside the filter and of less diameter than the filter but of greater diameter than the duct, said chamber having an open upper end into which the duct extends, and a restricted opening in its lower end whereby a large proportion of the dust passing out of the duct falls to the lower end of the chamber and passes out the restricted opening to the filter interior and a large proportion of the air from the duct passes out the upper end of the chamber, the upper end of the chamber connecting to the filter interior.

13. A recirculating dust system for dusting rubber products or the like including means for generating a dust-laden atmosphere, means for confining and directing said atmosphere into contact with said rubber products, means for exhausting said dust-laden atmosphere, filter means enclosing said exhaust means whereby the dust is retained within said filter means, vibrating means operatively associated with the filter means for shaking dust trapped by the filter material to the bottom thereof, and a dust return duct associated with the bottom of said filter means and communicating with said generating means whereby the dust separated out of the exhausted atmosphere is returned to the generating means.

14. A recirculating dust system for dusting rubber products or the like including means for generating a dust-laden atmosphere, means for confining and directing said atmosphere into contact with said rubber products, means for exhausting said dust-laden atmosphere, means for reducing the velocity of the dust-laden atmosphere as it is discharged from the exhaust means, filter means enclosing said last-named means and in sealed relation with said exhaust means whereby the dust is retained within said filter means, and a dust return duct associated with the bottom of said filter means and communicating with said generating means whereby the dust separated out of the exhausted atmosphere is returned to the generating means.

JOHN F. CAMPBELL.

REFERENCES CITED

The following references are of record in the file of this patent:

UNITED STATES PATENTS

| Number | Name | Date |
|---|---|---|
| 926,070 | Matchette | Jan. 22, 1909 |
| 1,035,988 | Miller et al. | Aug. 20, 1912 |
| 1,512,776 | Lough | Oct. 21, 1924 |
| 1,878,098 | Belluche | Sept. 20, 1932 |
| 1,887,052 | Wendeln | Nov. 8, 1932 |
| 2,338,807 | Emery | Jan. 11, 1944 |

FOREIGN PATENTS

| Number | Country | Date |
|---|---|---|
| 351,753 | Great Britain | July 2, 1931 |